(12) United States Patent
Bacon-Maldonado, III et al.

(10) Patent No.: US 10,766,710 B2
(45) Date of Patent: Sep. 8, 2020

(54) VEHICLE-MOUNTED CONVEYOR SYSTEM

(71) Applicant: Multilift, Inc., Lakewood, CO (US)

(72) Inventors: Job Bacon-Maldonado, III, Littleton, CO (US); Robert D. Drost, Highlands Ranch, CO (US); Chris K. Miller, Denver, CO (US); Kenneth B. Drost, Denver, CO (US); Job Maldonado, Jr., Littleton, CO (US); Kenton C. Ensor, Littleton, CO (US)

(73) Assignee: Multilift, Inc., Lakewood, CO (US)

( * ) Notice: Subject to any disclaimer, the term of this patent is extended or adjusted under 35 U.S.C. 154(b) by 0 days.

(21) Appl. No.: 16/279,827

(22) Filed: Feb. 19, 2019

(65) Prior Publication Data

US 2019/0256297 A1    Aug. 22, 2019

Related U.S. Application Data

(60) Provisional application No. 62/710,448, filed on Feb. 16, 2018.

(51) Int. Cl.
*B65G 41/00* (2006.01)
(52) U.S. Cl.
CPC .......... *B65G 41/001* (2013.01); *B65G 41/00* (2013.01); *B65G 41/002* (2013.01)
(58) Field of Classification Search
None
See application file for complete search history.

(56) References Cited

U.S. PATENT DOCUMENTS

| | | | |
|---|---|---|---|
| 2,541,523 | A | 2/1951 | Lang |
| 2,809,743 | A | 10/1957 | Hinchcliffe |
| 2,930,478 | A | 3/1960 | Ruffino |
| 2,987,169 | A | 6/1961 | Hinchcliffe |
| 3,085,676 | A | 4/1963 | Hinchcliffe |
| 3,100,566 | A | 8/1963 | Hinchcliffe |

(Continued)

OTHER PUBLICATIONS

U.S. Appl. No. 14/154,141, filed Jan. 13, 2014, now issued as U.S. Pat. No. 9,061,830.

(Continued)

*Primary Examiner* — Kavel Singh
(74) *Attorney, Agent, or Firm* — Sheridan Ross P.C.

(57) ABSTRACT

Embodiments of the present invention generally relate to a vehicle-mounted conveyor system, and more specifically a maneuverable and mobile system interconnected to a motor vehicle, such as a truck, for conveying products and material. In some embodiments, the conveyor system comprises: a first conveyor; a second conveyor; a conveyor mount, wherein the first conveyor is interconnected to the conveyor mount; a first plate; a second plate; a post interconnected to the first plate; an arm member interconnected on one end to the post and interconnected on a second end to the second plate; a first hydraulic cylinder interconnected to the post and the arm member; a rotator gear interconnected to the second plate and the conveyor mount; a second hydraulic cylinder interconnected to the conveyor mount and the rotator gear; and a vehicle stabilizer, wherein the conveyor system has a first travel position and a second deployed position.

19 Claims, 11 Drawing Sheets

(56) References Cited

U.S. PATENT DOCUMENTS

| | | | |
|---|---|---|---|
| 3,378,103 A * | 4/1968 | Zwight | B66F 11/044 182/141 |
| 3,542,299 A | 11/1970 | Sholl | |
| 3,822,526 A | 7/1974 | Black | |
| 3,910,405 A | 10/1975 | Couperus et al. | |
| 3,974,908 A | 8/1976 | Keichinger | |
| 4,143,759 A | 3/1979 | Paradis | |
| 4,534,461 A | 8/1985 | Silverthorn et al. | |
| 4,582,193 A | 4/1986 | Larson | |
| 4,700,078 A | 10/1987 | Mizuno et al. | |
| 4,727,419 A | 2/1988 | Yamada et al. | |
| 4,832,183 A | 5/1989 | Lapeyre | |
| 5,092,946 A | 3/1992 | Okuyama et al. | |
| 5,194,107 A | 3/1993 | Okuyama et al. | |
| 5,205,395 A | 4/1993 | Bruno et al. | |
| 5,415,217 A | 5/1995 | Okuyama et al. | |
| 5,568,857 A | 10/1996 | Chen et al. | |
| 5,685,687 A | 11/1997 | Frye | |
| 5,697,294 A | 12/1997 | Keller et al. | |
| 5,816,142 A | 10/1998 | Keller et al. | |
| 5,984,077 A | 11/1999 | Frye et al. | |
| 6,053,305 A | 4/2000 | Helmerson | |
| 6,142,290 A | 11/2000 | Tagliaferri | |
| 6,292,997 B1 | 9/2001 | Ollendick et al. | |
| 6,488,145 B1 | 12/2002 | Diego et al. | |
| 6,527,499 B2 | 3/2003 | Leimbach et al. | |
| 6,871,868 B2 | 3/2005 | Pogue | |
| 6,926,134 B2 | 8/2005 | Verdigets et al. | |
| 7,249,496 B2 | 7/2007 | Kunitake et al. | |
| 7,347,317 B2 | 3/2008 | Aizawa et al. | |
| 7,487,814 B2 | 2/2009 | Mizota | |
| 7,543,698 B2 | 6/2009 | Haskell | |
| 8,401,146 B2 | 3/2013 | Vorhees | |
| 8,876,455 B2 | 11/2014 | Pogue | |
| 9,061,830 B2 | 6/2015 | Miller et al. | |
| 9,260,247 B2 | 2/2016 | Miller et al. | |
| 9,745,133 B2 | 8/2017 | Miller et al. | |
| 9,783,093 B1 | 10/2017 | Esch | |
| 9,856,087 B2 | 1/2018 | Beesley | |
| 10,065,801 B2 | 9/2018 | Miller et al. | |
| 10,150,660 B2 | 12/2018 | Koppelaar et al. | |
| 2005/0040015 A1 | 2/2005 | Schlegel et al. | |
| 2005/0279616 A1 | 12/2005 | Pogue | |
| 2006/0182575 A1 | 8/2006 | Pogue | |
| 2007/0084275 A1 | 4/2007 | Gotou et al. | |
| 2007/0135960 A1 | 6/2007 | Shibao et al. | |
| 2007/0289847 A1 | 12/2007 | Nakamura | |
| 2008/0053796 A1 | 3/2008 | DePaso et al. | |
| 2008/0173521 A1 | 7/2008 | Hitch | |
| 2008/0298940 A1 | 12/2008 | Cleasby et al. | |
| 2009/0010747 A1 | 1/2009 | Pogue | |
| 2009/0148260 A1 | 6/2009 | Leimbach et al. | |
| 2009/0294246 A1 | 12/2009 | Pogue | |
| 2010/0043952 A1 | 2/2010 | Terazono | |
| 2011/0013177 A1 | 1/2011 | Crim | |
| 2012/0092149 A1 | 4/2012 | Fujisawa | |
| 2012/0325903 A1 | 12/2012 | Takahashi | |
| 2014/0182070 A1 | 7/2014 | Clark | |
| 2016/0031650 A1 | 2/2016 | Petersen et al. | |
| 2018/0370731 A1 | 12/2018 | Miller et al. | |

OTHER PUBLICATIONS

U.S. Appl. No. 14/641,126, filed Mar. 6, 2015, now issued as U.S. Pat. No. 9,260,247.

U.S. Appl. No. 15/041,668, filed Feb. 11, 2016, now issued as U.S. Pat. No. 9,745,133.

U.S. Appl. No. 15/673,014, filed Aug. 9, 2017, now issued as U.S. Pat. No. 10,065,801.

U.S. Appl. No. 16/119,804, filed Aug. 31, 2018, now published as U.S. Pub. No. 2018/0370731.

U.S. Appl. No. 16/431,628, filed Jun. 4, 2019.

U.S. Appl. No. 16/431,628, filed Jun. 4, 2019, Bacon-Maldonado III et al.

"Econo-Cleat®," Flexco, 2015, retrieved from: http://www.flexco.com/products/mobile_econo_cleat.html, 2 pages.

"Increase Productivity, Improve Versatility, Create Solutions," The Lowdown Conveying Important Information, 2005, vol. 4(1), retrieved from: http://www.flexco.com/filebase/en/src/Bett_Conveyor_Insights/IncreaseProductivityImprov.pdf, 2 pages.

"EXT-52 Conveyor," Cleasby Manufacturing, Date Unknown, retrieved from: http://www.cleasbyconveyors.com/ext-52-conveyor/ on Feb. 15, 2018, 5 pages.

"FBR Conveyor," Cleasby Manufacturing, Date Unknown, retrieved from: http://www.cleasbyconveyors.com/products/truck-mounted-conveyors/fbr-conveyor/ on Feb. 15, 2018, 3 pages.

"New On-Road & Off-Road Slinger Trucks and Equipment at CAS Slingers," CAS Slingers, Date Unknown, retrieved from: https://slingers.com/new-equipment/models/ on Feb. 15, 2018, 3 pages.

"Stone Slinger High-Speed Conveyor Trucks," Stone Slinger, 2017, retrieved from: http://stoneslinger.com/ on Feb. 15, 2018, 1 page.

\* cited by examiner

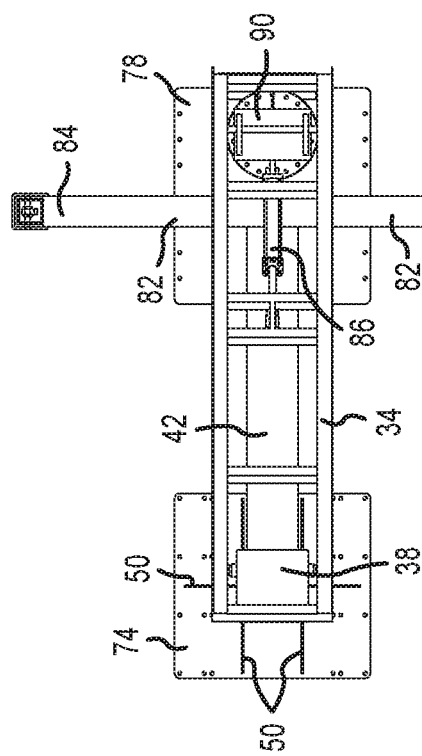
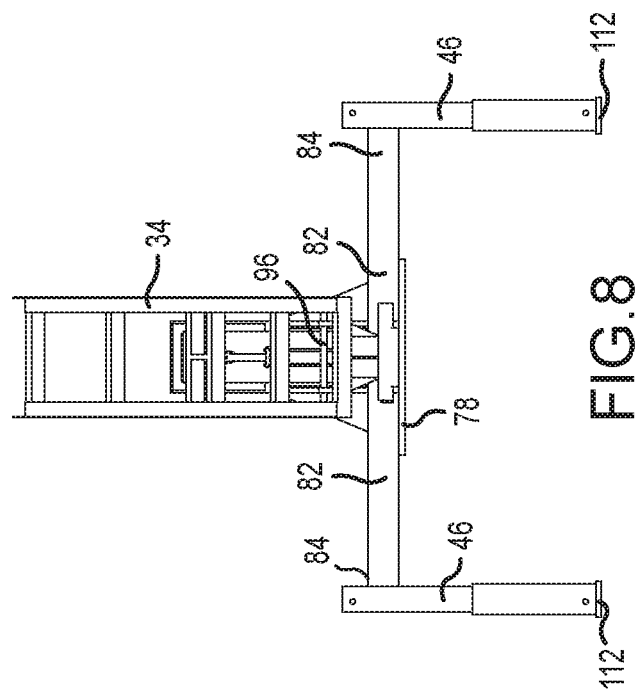
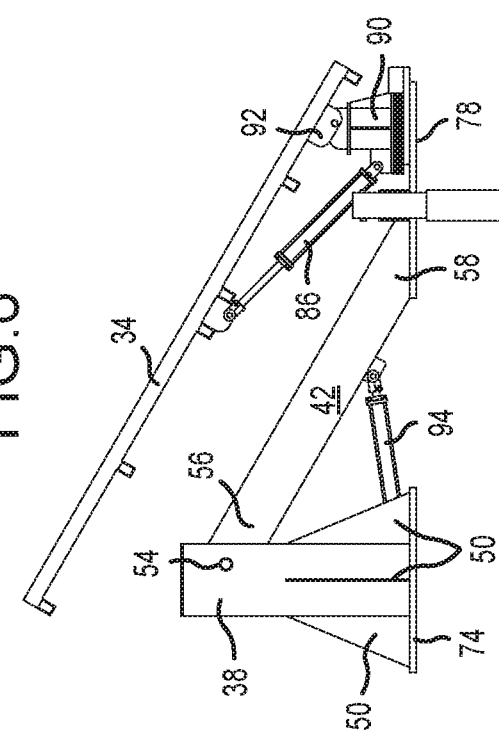

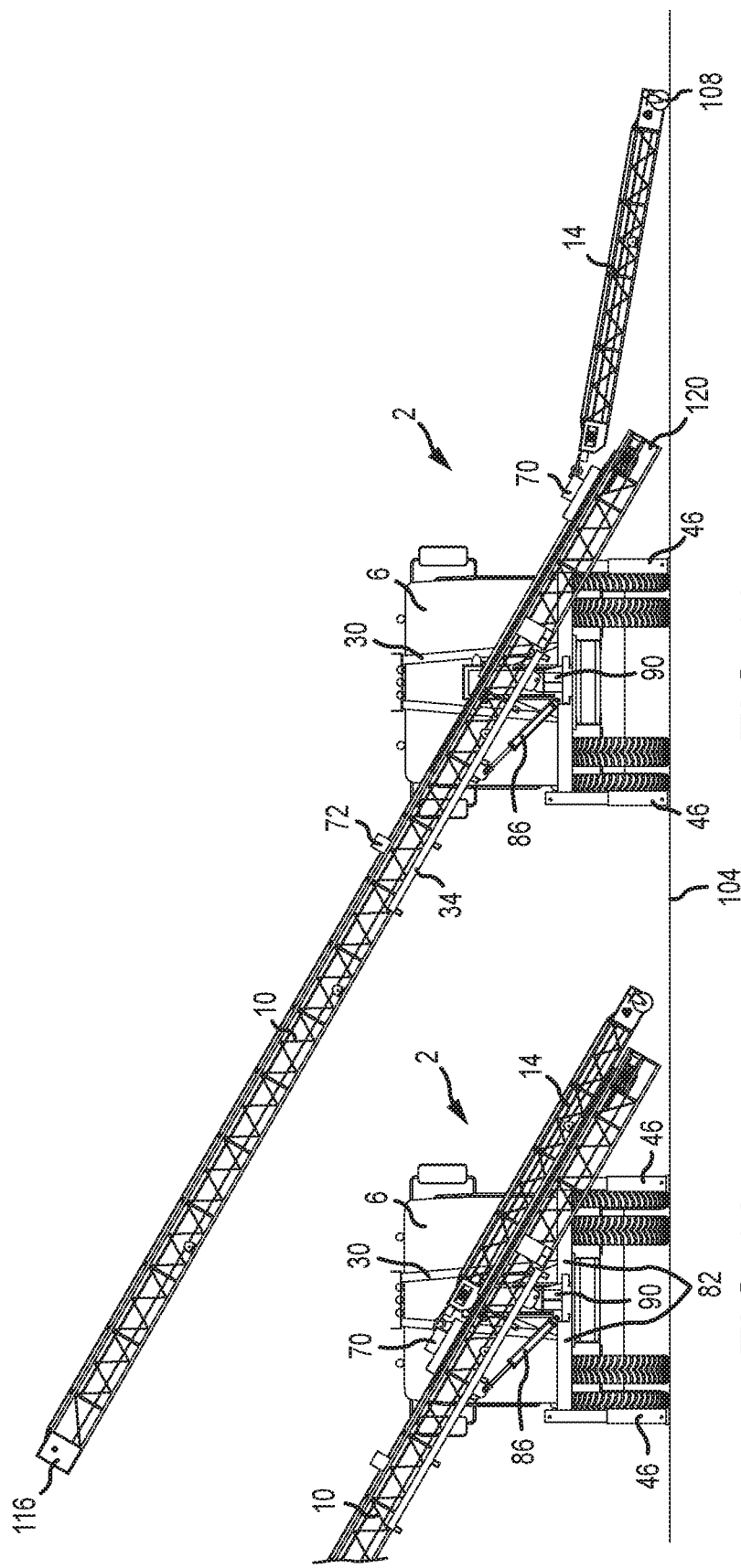

VEHICLE-MOUNTED CONVEYOR SYSTEM

CROSS REFERENCE TO RELATED APPLICATIONS

This application claims the benefit of U.S. Provisional Application No. 62/710,448, filed on Feb. 16, 2018, entitled "Vehicle-Mounted Conveyor System," the entire disclosure of which is incorporated by reference herein.

FIELD OF THE INVENTION

Embodiments of the present invention generally relate to a vehicle-mounted conveyor system, and more specifically to a maneuverable and mobile system interconnected to a motor vehicle, such as a truck, for conveying products and material.

BACKGROUND OF THE INVENTION

Conveyors are typically used at one site and rolled around on wheels to move from specific location to location within the site. Conveyors typically cannot rotate right to left to change the orientation of the conveyor. Few conveyors exist that are interconnected to a vehicle such that they can be used at various sites, e.g., construction sites.

Truck-mounted conveyors usually require a CDL-rated truck. Further, truck-mounted conveyors typically convey articles and cannot handle loose materials. The truck-mounted conveyors that can handle loose material are typically attached to a dump truck.

SUMMARY OF THE INVENTION

Accordingly, there exists a significant need for a conveyor system that is maneuverable and mobile such that it can be employed at various job sites, that is transportable by a vehicle less than 26,000 pounds GVWR (Gross Vehicle Weight Rating) such that a commercial driver's license is not required to operate the vehicle, and that can convey loose material.

These and other needs are addressed by the various embodiments and configurations of the present invention. This invention relates to a novel system, device, and method for providing a conveying system capable of being transported by a vehicle that is less than 26,000 pounds GVWR. The novel conveyor system provided herein can convey articles (e.g., tires), and loose material (e.g., dirt, landscape rock, backfill), and concrete additives (e.g., plastic fibers, steel wires, ice).

Thus, it is one aspect of various embodiments of the present invention to provide a conveyor system with an ultimate degree of jobsite maneuverability and road safety during transport.

It is one aspect of various embodiments of the present invention to provide a conveyor system transportable by a vehicle not greater than 26,000 pounds GVWR and thereby not requiring a Commercial Driver's License (CDL) to operate the vehicle. In one embodiment, the conveyor is interconnected to a non-CDL truck that does not carry a payload, nor is there a place for payload on the truck. However, in some embodiments, the novel conveyor system can be mounted on a CDL truck having a GVWR greater than 26,000 pounds and/or carrying payload.

It is another aspect of various embodiments of the present invention to provide a conveyor system that can convey and stack salt/sand mixtures used by road and highway departments during winter conditions. This mixture is generally stored in shelters to guard it from moisture.

It is one aspect of various embodiments of the present invention to provide a conveyor system that serves as a general utility conveyor around concrete-mixing-batch plants. It is a further aspect of various embodiments of the present invention to provide a vehicle-mounted conveyor system for placing concrete mix additives into mobile cement-mixer trucks. Examples of these additives include reinforcement plastic fibers and steel wires, which are added to wet concrete mix, or ice to slow the hardening process of concrete during hot summer days. Existing concrete-mixing-batch plants are not readily set up to load these additives into the transport vehicles. As such, it is an advantage of the present invention to provide a system that permits the concrete-mixing-batch plants to load the additives into the vehicles.

It is another aspect of various embodiments of the present invention to provide a conveyor system that can serve as a small end "stacker" at road base recycling crushing sites. Some embodiments can include larger sized "stackers" for higher reach, but these embodiments may require a CDL-rated truck.

One aspect of various embodiments of the present invention is to provide a conveyor system with a novel mechanism that attaches to the channel frame rails of the transport vehicle. The manner of design of the entire mounting mechanism—less various standard components within it, such as the hydraulics and the rotator gear—is new and unique to the market. The mounting mechanism is designed to lift and hold the conveyor in a substantially horizontal position for road travel. When the conveyor is set up in its operating position, the mechanism lowers the infeed (bottom) end of the conveyor to the ground, elevates the discharge (top) end of the conveyor up to about a 30° to 45° incline, and rotates the conveyor up to 180° to the left or right.

Some embodiments of the present invention include a conveyor system with two independently driven conveyors: the main incline conveyor and a feed conveyor. In one embodiment, the feed conveyor is interconnected to the bottom end of the incline conveyor. For the travel position, the feed conveyor piggy backs onto the incline conveyor. For operation, the feed conveyor is lowered off of the incline conveyor via a track and trolley system (also called a "trolley rail system" herein). The feed conveyor can pivot approximately 90° relative to the incline conveyor in either direction to facilitate the approach of dump trucks loading directly onto the feed conveyor. The track and trolley system then returns the feed conveyor onto the incline conveyor for transport.

It is one aspect of embodiments of the present invention to provide a conveyor system that can place gravel or rock onto flat top roofs. Some embodiments can place the gravel or rock on roofs that are over 30 feet tall, while other embodiments are designed for roofs that are less than 30 feet tall. Additional embodiments include a conveyor system that can place dirt, landscape rock, and backfill into hard-to-reach places such as behind newly constructed retaining walls or landscape planters. Some embodiments include a conveyor to serve odd applications that arise, such as filling a coffer dam with dirt.

It is also an aspect of the present invention to provide a conveyor system comprising a conveyor belt, support elements to support the articles being conveyed, a support frame for the belt and to raise the conveyor belt upward, and a power source. The conveyor belt may include sections secured together, one or more pieces of belt material, strengthening mechanisms either below or between the one or more pieces of belt material to support the support elements, an upper surface, and an under surface. The power source may comprise electrical components and a motor. Note that the terms "cleat," "flight," and "support element" can be used interchangeably herein.

In some embodiments, the conveyor may be specially designed to move articles (including bricks, tiles, roofing materials, dirt, tires, etc.) upwardly at incline angles up to 60 degrees.

In various embodiments, the features of the incline conveyor and/or feed conveyor include: a 12-24" wide 2-ply rubber-covered top belt sliding flat at 30-90 FPM, one up/stop/down switch at a bottom end, a 1 hp 115V 13 FLA electric motor with speed reducer mounted under the bottom end, a thermal overload motor protector, a rubber lagged conveyor belt drive pulley, a plain idler pulley with belt tensioner, a high strength steel tubing truss conveyor frame, and a base plate. In additional embodiments, the conveyors may include: an off switch at the top end, up/emergency and stop/down switches at both ends of the conveyors, an 18" wide belt, and a smooth or rough upper surface of the belt for shallow or steep inclines. In some embodiments, the width of the belt is larger than 24" and in other embodiments the width of the belt is less than 12".

In some embodiments, the incline conveyor and/or feed conveyor can also include one or more 4" high urethane cleats bolted to the belt, cleats with curved forward surfaces, cleats with flat forward surfaces, and/or 6" high cleats for vertical lift uses. In various embodiments, the cleats may be attached, secured, or interconnected to the belt using a set of two bolts. Further, the bolts may be ¼"×1¼" #1 elevator bolts with hardware. The cleats may also include holes for the bolts or other interconnection mechanisms. In some embodiments, the cleats are permanently attached to the belt. In other embodiments, the cleats are removable. In one embodiment, the cleats are attached without the use of screws. In some embodiments, the cleats may flip up when going up the conveyor and flip down when going down the back of the conveyor. In one embodiment, the cleats may be hinged to the belt such that they can flip up and down. Other flip mechanisms may also be contemplated by one skilled in the art. In some embodiments, the cleats may be flexible. Thus, each cleat may be constructed entirely from an elastomeric material that provides flexibility. In one embodiment, the cleat or support element is flexible along the length of cleat such that when a tire or article is positioned on the conveyor belt, the two cleats bend in a direction opposite the direction of belt travel along the conveying path. In other embodiments the cleats may be rigid.

In some embodiments, the incline conveyor and/or feed conveyor include one of more of the following items: two continuously revolving #55 detachable chains, 23" wide×⅞" O.D. high strength steel tubing conveyor frame, chain take-up adjustments, brake hand winch, steel wire rope and pulleys, elevating mechanism and safety chain, 40-90 FPM chain or conveyor belt speed, approximate 80 FPM constant chain speed, 115 VAC electric motor, motor and speed reducer mounted inside the frame at the loading end, a roller chain and sprocket drive with guard, and/or an electric cable winch.

In some embodiments, the conveyor system comprises: a first conveyor; a second conveyor; a conveyor mount, wherein the first conveyor is interconnected to the conveyor mount; a first plate; a second plate; a lift system comprising a post interconnected to the first plate, an arm member interconnected on one end to the post and interconnected on a second end to the second plate, and a hydraulic cylinder interconnected to the post and the arm member; a rotator gear interconnected to the second plate and the conveyor mount; a second hydraulic cylinder interconnected to the conveyor mount and the rotator gear; and a vehicle stabilizer, wherein the conveyor system has a first travel position and a second deployed position.

In some embodiments, a conveyor system capable of being interconnected to a motor vehicle is provided comprising: a first conveyor; a second conveyor interconnected to the first conveyor; a conveyor mount, wherein the first conveyor can be interconnected to the conveyor mount; a first plate interconnected to a first flat portion of the motor vehicle; a post interconnected to the first plate and extending upwardly from the first plate; a first arm member interconnected on a first end to the post; a second plate interconnected to a second end of the first arm member; a second arm member interconnected to an upper surface of the second plate; a first vehicle stabilizer extending downward from a first end of the second arm member; a second vehicle stabilizer extending downward from a second end of the second arm member; a rotator gear interconnected to the upper surface of the second plate and the conveyor mount; a first hydraulic cylinder interconnected to the post and the first arm member; and a second hydraulic cylinder interconnected to the conveyor mount and the rotator gear, wherein the conveyor system has a first travel position and a second deployed position.

In various embodiments, the first plate and the second plate have substantially flat upper surfaces and substantially flat lower surfaces. In some embodiments, when the conveyor system is in the second deployed position the second plate can be positioned on a second flat portion of the motor vehicle. In various embodiments, the second conveyor can be interconnected to the first conveyor via a trolley rail system, wherein the trolley rail system raises and lowers the second conveyor along the first conveyor. Additionally, the trolley rail system comprises a trolley and one or more rails, and wherein a top end of the second conveyor can be interconnected to the trolley. In various embodiments, the second conveyor can rotate 180 degrees relative to the first conveyor. In some embodiments, the first conveyor can be positioned at an angle between about 30 degrees and about 60 degrees relative to a horizontal plane when the conveyor system is in the second deployed position. Additionally or alternatively, the first arm member can be rotatably interconnected to an upper portion of the post. In various embodiments, when the conveyor system is in the first travel position the first hydraulic cylinder can be extended and pushing upward on the first arm member, and wherein when the conveyor system is in the second deployed position the first hydraulic cylinder can be in a compressed position and can be pulling downward on the first arm member.

In some embodiments, a conveyor system interconnected to a motor vehicle is provided comprising: an incline conveyor; a feed conveyor interconnected to the first conveyor, wherein the feed conveyor can be shorter than the incline conveyor; a conveyor mount, wherein the incline conveyor can be interconnected to the conveyor mount; a first plate interconnected to a first flat portion of the motor vehicle; a post interconnected to the first plate and extending upwardly from the first plate; a plurality fins extending outward from the post and interconnected to an upper surface of the second plate; an arm member interconnected on a first end to the post; a second plate interconnected to a second end of the arm member; a rotator gear interconnected to the upper surface of the second plate and the conveyor mount; a first hydraulic cylinder interconnected to the post and the arm member, wherein the first hydraulic cylinder; and a second hydraulic cylinder interconnected to the conveyor mount and the rotator gear, wherein the second hydraulic cylinder moves the conveyor mount and incline conveyor into a desired angle relative to a ground surface, wherein the conveyor system has a first travel position and a second deployed position, and wherein when the conveyor system is in the first travel position the first hydraulic cylinder can be extended and pushing upward on the first arm member, and wherein when the conveyor system is in the second deployed position the first hydraulic cylinder can be in a compressed position and can be pulling downward on the first arm member.

In various embodiments, the first plate and the second plate have substantially flat upper surfaces and substantially flat lower surfaces, and wherein when the conveyor system is in the second deployed position the second plate can be positioned on a second flat portion of the motor vehicle. In some embodiments, the system further comprises at least two vehicle stabilizers. In various embodiments, the feed conveyor can be interconnected to the incline conveyor via a trolley rail system, wherein the trolley rail system raises and lowers the feed conveyor along the incline conveyor. Additionally, the trolley rail system comprises two rails and a trolley having two slides that slide along the two rails, a center bar interconnecting the two slides, and a first ring interconnected to the center bar, and wherein a top end of the second conveyor can be interconnected to the trolley via an interconnection mechanism having a second ring interconnected to the first ring of the trolley. In various embodiments, the feed conveyor can rotate 180 degrees relative to the incline conveyor. In some embodiments, the incline conveyor can be positioned at an angle between about 30 degrees and about 60 degrees relative to the horizontal plane when the conveyor system is in the second deployed position. In various embodiments, the first arm member can be rotatably interconnected to an upper portion of the post.

In some embodiments, a method for deploying a vehicle-mounted conveyor system is provided comprising: providing a first conveyor and a second conveyor interconnected to the first conveyor; providing a conveyor mount and interconnecting the first conveyor to the conveyor mount; interconnecting a first plate to a first flat portion of a motor vehicle; providing a post interconnected to the first plate, wherein the post extends upwardly from the first plate; providing a first arm member interconnected on a first end to the post at an interconnection point, a second plate interconnected to a second end of the first arm member, a second arm member interconnected to an upper surface of the second plate, a first vehicle stabilizer extending downward from a first end of the second arm member, a second vehicle stabilizer extending downward from a second end of the second arm member, a rotator gear interconnected to the upper surface of the second plate and the conveyor mount, a first hydraulic cylinder interconnected to the post and the first arm member, and a second hydraulic cylinder interconnected to the conveyor mount and the rotator gear; positioning the conveyor system in a first travel position; contracting the first hydraulic cylinder and pulling downward on the first arm member; rotating the first arm member around the interconnection point until the second plate can be positioned on a second flat surface of the motor vehicle, wherein the second hydraulic cylinder and the rotator gear pull downward on the conveyor mount; extending the first and second vehicle stabilizers to a ground surface; extending the second hydraulic cylinder to position the conveyor mount and the first conveyor at a desired angle relative to the ground surface; rotating the rotator gear to rotate the conveyor mount and the first conveyor at a desired position; and sliding the second conveyor down the first conveyor and into a desired feed position.

In some embodiments, the method further comprises providing a trolley rail system for raising and lowering the second conveyor along the first conveyor, where the trolley rail system comprises a trolley and one or more rails, and wherein a top end of the second conveyor can be interconnected to the trolley.

Any known conveyor can be used with the present invention. For example, conveyors such as those described in U.S. Pat. No. 9,260,247 to Miller et al., which is incorporated by reference herein in its entirety, can be used with the present invention.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the disclosure given above and the Detailed Description of the drawings given below, serve to explain the principles of the disclosures.

FIG. 6 is top plan view of the conveyor system without the conveyors and in the deployed position;

FIG. 7 is a side elevation view of the conveyor system of FIG. 6;

FIG. 8 is a rear elevation view of the conveyor system of FIGS. 6 and 7 with the stabilizers deployed;

FIG. 10 is a rear elevation view of an embodiment of the conveyor system interconnected to a vehicle with the conveyors stacked on top of one another and rotated 90 degrees to the left;

FIG. 11 shows the system of FIG. 10, but the feed conveyor has been released and slid down the incline conveyor;

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 1:
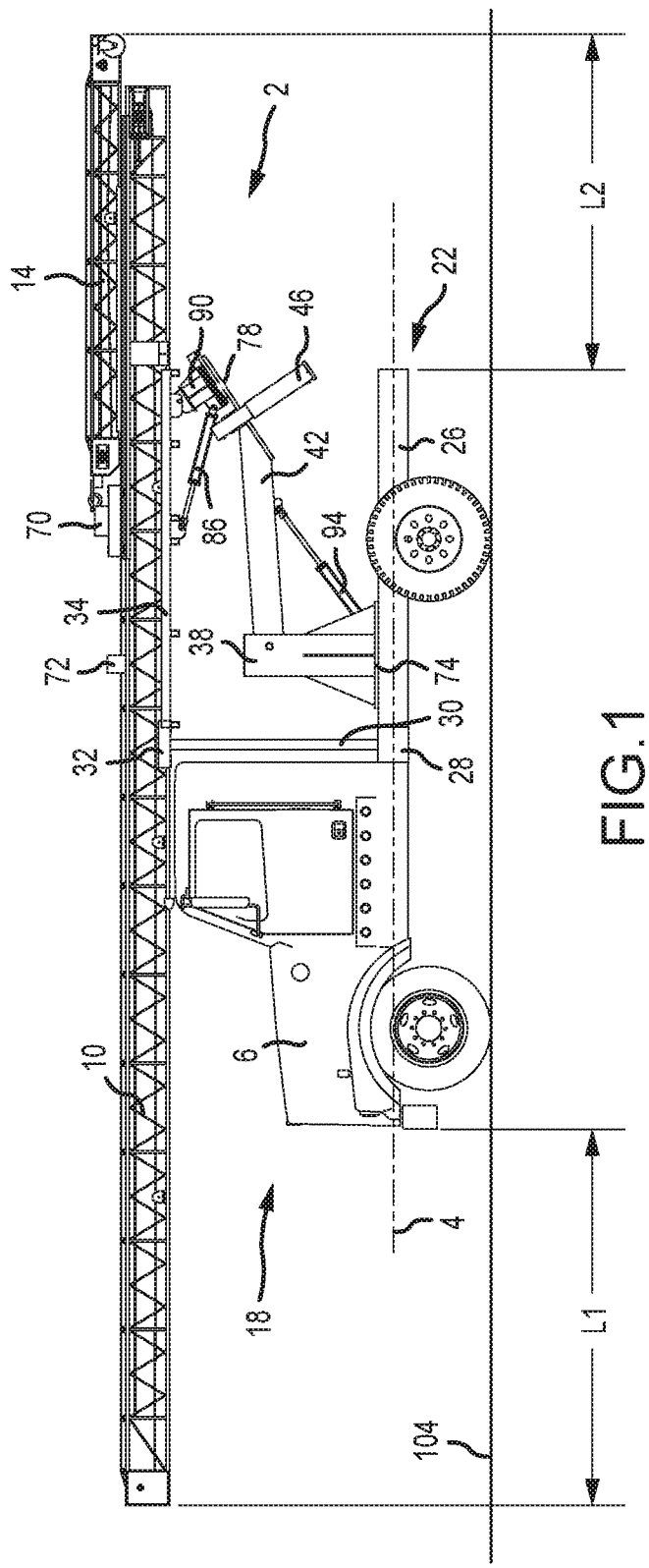
FIG. 1 is a side elevation view of an embodiment of a conveyor system mounted on a vehicle and in the road-travel position.
Figure 2:
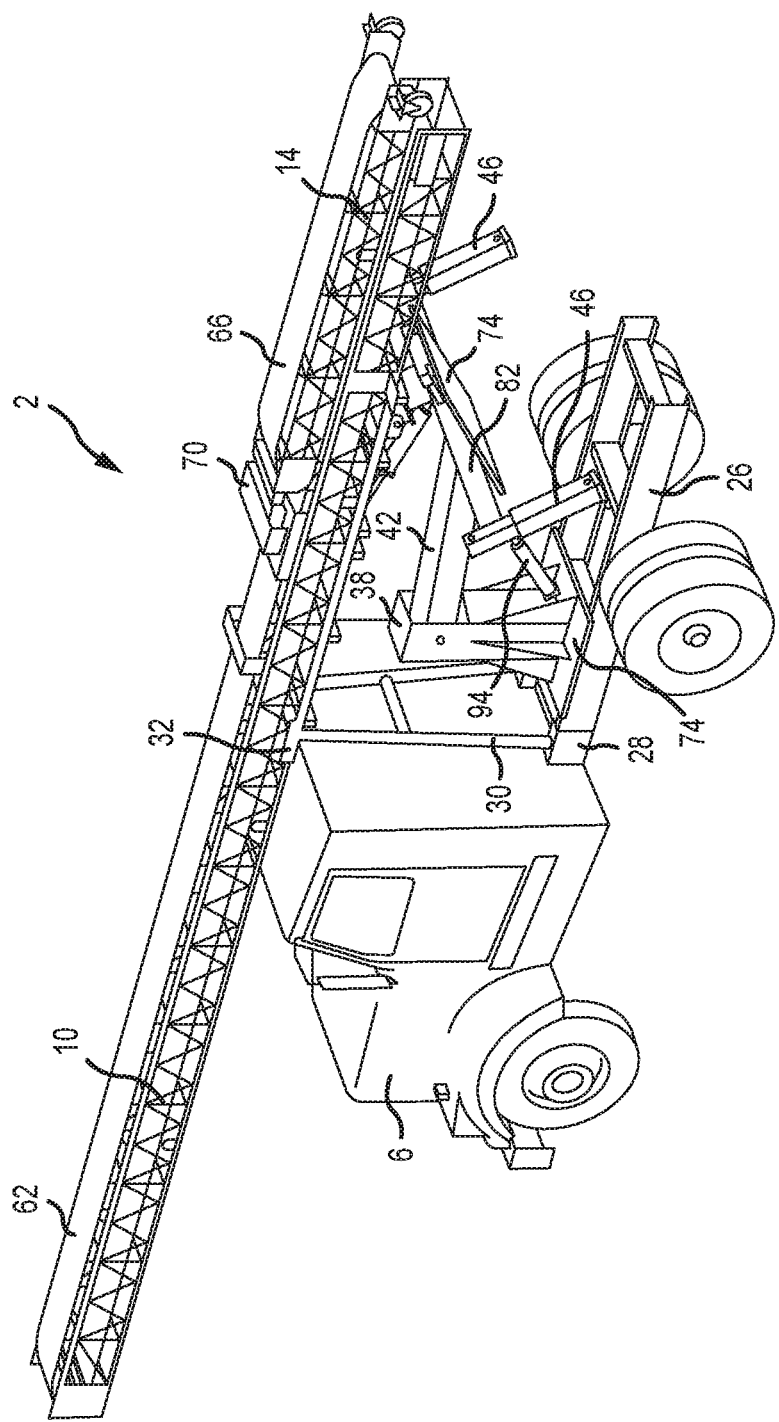
FIG. 2 is a rear perspective view of the conveyor system mounted on a vehicle and in the road-travel position.

FIGS. 1 and 2 show an embodiment of a conveyor system 2 mounted on a vehicle 6 and in the road-travel position. FIG. 1 is a side elevation view of the conveyor system 2 and FIG. 2 is a rear perspective view. The vehicle 6 is positioned on the ground 104. The conveyor system 2 can be ultra-portable for aggregate stacking and transloading. In one embodiment, the conveyor system 2 can be a PTO-driven, self-contained system for class 6 vehicles, including medium duty trucks that do not require a CDL license to operate. The conveyor system 2 can be interconnected to a vehicle 6 (as shown) and be highway drivable. In one embodiment, the conveyor system 2 includes a 40-foot incline conveyor 10 and a 12-foot feed conveyor 14. In some embodiments, the conveyor system 2 includes an incline conveyor 10 with a length between about 20 feet and about 60 feet. In preferred embodiments, the conveyor system 2 includes an incline conveyor 10 with a length between about 30 feet and about 50 feet. In some embodiments, the conveyor system 2 includes a feed conveyor 10 with a length between about 5 feet and about 20 feet. In preferred embodiments, the conveyor system 2 includes a feed conveyor 10 with a length between about 8 feet and about 16 feet. All embodiments described herein can include conveyors 10, 14 of different lengths. The incline conveyor 10 can be one long conveyor or it can be comprised of two or more conveyors strung together end-to-end. Typically, the feed conveyor 14 is shorter than the incline conveyor 10.

In various embodiments, the conveyor system 2 only extends beyond the front 18 of the vehicle 6 a distance L1 between about 8.0 feet and 16.0 feet. In a preferred embodiment, the conveyor system 2 only extends beyond the front 18 of the vehicle 6 a distance L1 between about 10.0 feet and 14.0 feet. In a more preferred embodiment, the conveyor system 2 extends beyond the front 18 of the vehicle 6 a maximum distance L1 of about 12.0 feet. In some embodiments, the conveyor system 2 only extends beyond the rear 22 of the vehicle 6 a distance L2 between about 6.0 feet and 14.0 feet. In a preferred embodiment, the conveyor system 2 only extends beyond the rear 22 of the vehicle 6 a distance L2 between about 8.0 feet and 12.0 feet. In a more preferred embodiment, the conveyor system 2 only extends beyond the rear 22 of the vehicle 6 a maximum distance L2 of about 10.0 feet. The feed conveyor 14 can slide along the incline conveyor 10 via a trolley rail system 70. The incline conveyor 10 can include a stop mechanism 72 that prevents the trolley rail system 70 and feed conveyor 14 from sliding too far along the incline conveyor 10. In some embodiments, the stop mechanism 72 can be removable and be removed before articles are conveyed on the incline conveyor 10. In some embodiments, the stop mechanism 72 is not removable and the conveyed articles pass under the stop mechanism 72 as they are conveyed up the conveyor. In some embodiments, the conveyors 10, 14 include conveyor belts 62, 66 for conveying the material to transport. In some embodiments, the conveyors 10, 14 do not include conveyor belts; rather, the conveyors have flights, cleats, support elements, or other conveying mechanisms that extend upwardly from the top surface of the conveyor. In various embodiments, the flights, cleats, support elements, or other conveying mechanisms may be metal, plastic, another material known in the art, or combinations thereof. These elements can have padding on the forward-oriented surface that engages the articles to convey.

In some embodiments, the conveyor system 2 is mounted on a bed or frame 26 of the vehicle 6 proximate the rear end 22 of the vehicle 6. The conveyor system 2 can be interconnected to the vehicle 6 and/or held in the road-travel position via a stand 30 with a bottom portion or clamp 28 and a holder 32. The stand 30 can be interconnected to the truck bed or frame 26 and extend substantially vertically from the truck bed 26. The stand 30 can include a bottom portion 28 that can be a clamp or other mechanism to secure the stand 30 to the bed or frame 26 and the stand 30 can include a substantially horizontal holder 32 that holds and supports the incline conveyor 10. The bottom portion 28 can be locked, secured, screwed, adhered, welded, or otherwise interconnected to the frame or truck bed 26. The holder 32 may have locks, flaps, and/or tabs that can grip and hold the conveyor 10 in the road-travel position. The locks, flaps, and/or tabs can be manually controlled or automatically controlled via a remote control. Thus, the locks, flaps, and/or tabs must be released before the conveyor 10 can be moved from the road-travel position to the deployed position or position of use. The holder 32 can be positioned next to a mount 34, which is positioned substantially horizontally for road travel. The incline conveyor 10 rests on or is interconnected to the conveyor mount 34 when the system 2 is in the road-travel position. The incline conveyor 10 can be locked or otherwise secured to the mount 34.

The conveyor system 2 can comprise a central post 38 interconnected to the bed 26 of the vehicle 6. A first plate 74 can be positioned between the central post 38 and the truck bed 26 to distribute the load and provide a sturdy interconnection mechanism for the central post 38 and conveyor system 2. An arm member 42 (also called an "arm" herein) extends from an upper end of the central post 38. Vehicle stabilizers 46 are interconnected to opposing ends 84 of a second arm member 82 (also called an "arm" herein) extending outwardly from a distal end 58 of the first arm member 42 (see FIG. 4). A second plate 78 can be interconnected to the second arm member 82 and/or the distal end 58 of the first arm member 42. A rotator gear 90 can be interconnected to the second plate 78. The rotator gear 90 rotates or pivots the conveyor 10 relative to a longitudinal axis 4 of the vehicle 6. In some embodiments, the rotator gear 90 is interconnected to the mount 34 via a first hydraulic cylinder 86. The first hydraulic cylinder 86 assists with and can control the tilt angle of the conveyor 10 relative to the ground 104 or a horizontal plane. For example, the first hydraulic cylinder 86 can extend and contract to push or pull the conveyor 10 to the desired angle relative to the ground 104. A user may manually tilt the conveyor 10 to the desired angle and lock the hydraulic cylinder 86 or the hydraulic cylinder 86 can be motorized such that it can push on or pull the conveyor 10 into the desired position. The user can control the first hydraulic cylinder 86 using controls attached to the system or using remote controls. In some embodiments, other mechanisms or a standard arm member can be used in the place of the hydraulic cylinder 86 to raise and lower the conveyor 10.

In various embodiments, the conveyors 10, 14 are connected to the vehicle 6 through various components. Specifically, the incline conveyor 10 is interconnected to the mount 34, which is interconnected to the first hydraulic cylinder 86, which is interconnected to the rotator gear 90, and the mount 34 is rotatably interconnected to the rotator gear 90, which is interconnected to the second plate 78, which is interconnected to the second arm member 82 and/or the distal end of the first arm member 42, the first arm member 42 is interconnected to the central post 38 and second hydraulic cylinder 94, which are both interconnected to the first plate 74, which is interconnected to the bed or frame 26 of the vehicle 6. In some embodiments, a portion of a bottom surface of the second arm member 82 is interconnected to and adjacent to a portion of an upper surface of the second plate 78. Additionally or alternatively, an end surface of the first arm member 42 can be interconnected to a portion of the upper surface of the second plate 78.

In the road-travel position, the conveyors 10, 14 are positioned substantially horizontally and substantially parallel to the ground 104. In this position, the vehicle stabilizers 46 are raised such that they do not touch the ground 104. Preferably, the vehicle stabilizers 46 are raised above the truck bed 26 such that they do not hit the ground 104 as the vehicle 6 travels. In some embodiments, the vehicle stabilizers 46 are fixedly interconnected (not rotatable) to the second arm 82, which is fixedly interconnected (not rotatable) to the second plate 78; thus, the vehicle stabilizers 46 remain substantially perpendicular to the second plate 78 and are at an angle between about 20 degrees and about 70 degrees relative to the ground 104 when in the road-travel position. Additional vehicle stabilizers 46 can be interconnected to the vehicle 6 or vehicle frame or bed 26. For example, the system can include a total of four vehicle stabilizers 46, with two in the position shown and two additional vehicle stabilizers 46 proximate the stand 30 or a forward end of the vehicle bed 26.

Figure 3:
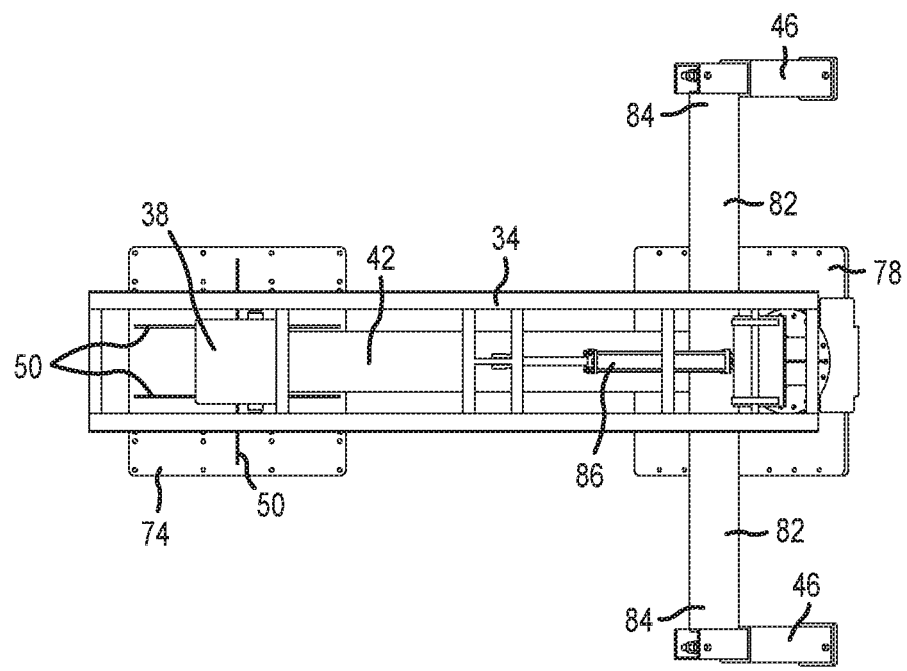
FIG. 3 is a top plan view of the conveyor system without the conveyors and positioned in the road-travel position.
Figure 4:
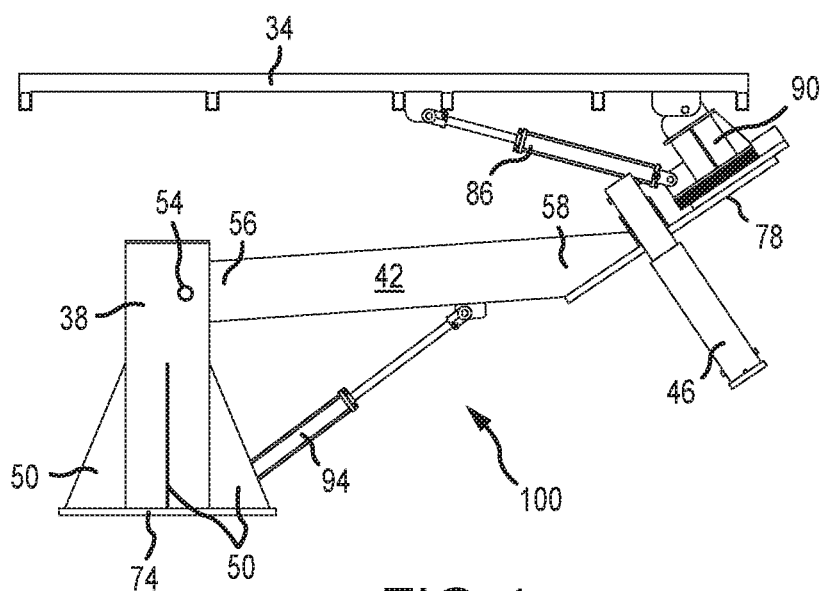
FIG. 4 is a side elevation view of the conveyor system without the conveyors and positioned in the road-travel position.

FIG. 3 is a top plan view of the conveyor system 2 without the conveyors and FIG. 4 is a side elevation view. FIGS. 3 and 4 show the mount system and components in the road-travel position. The system 2 includes a conveyor mount 34, to which the conveyors are mounted. In some embodiments, the incline conveyor 10 is mounted to the mount 34. The conveyor mount 34 is typically a metal material, composite material, or another strong material and is comprised of horizontal, vertical, and/or angled bars or rails to which the conveyors can be mounted, interconnected, stored, and/or supported. The conveyor system 2 also includes a first plate 74, a second plate 78, vehicle stabilizers 46, a first hydraulic cylinder 86 interconnected to the conveyor mount 34 on one end and a rotator gear 90 on the other end, and a second hydraulic cylinder 94.

The conveyor system 2 can include a lift system 100 for lifting the conveyors. The lift system 100 comprises a central post 38 interconnected on a bottom end to the first plate 74 and interconnected to a proximal end 56 of a first arm member 42. In some embodiments, the first arm member 42 can be rotatably interconnected to the central post 38 at a pivot point 54 proximate a top end of the central post 38. A distal end 58 of the first arm member 42 can be interconnected to the second plate 78. The lift system 100 can also include a second hydraulic cylinder 94 interconnected on one end to the first arm member 42 and interconnected on a second end to at least one of the central post 38, a fin 50, and/or the first plate 74. The second hydraulic cylinder 94 can be interconnected to a bottom surface of the first arm member 42, at a point between the distal end 58 and proximal end 56 of the first arm member 42. The second hydraulic cylinder 94 holds the first arm member 42 in the appropriate position for the road-travel position. Because the first arm member 42 is interconnected to the second plate 78, which is interconnected to the first hydraulic cylinder 86, which is interconnected to the mount 34, the second hydraulic cylinder 94 assists in keeping the mount 34 in the correct position for road-travel. Thus, in some embodiments, the second hydraulic cylinder 94 holds the system 2 in the road-travel position. As shown in FIG. 1, the holder 32 on the stand 30 also holds the system in the road-travel position. If the second hydraulic cylinder 94 pulls downward on the first arm 42, then the second plate 78 and rotator gear 90 will be pulled downward, which will pull the first hydraulic cylinder 86 and the mount 34 downward to orient the conveyors 10, 14 in the deployed position. Accordingly, one purpose of the second hydraulic cylinder 94 is to raise and lower the conveyors 10, 14 and hold the conveyors 10, 14 in the road-travel position.

In some embodiments, the first arm member 42 can also be interconnected a second arm member 82. In various embodiments, the second arm member 82 can be interconnected to the second plate 78 and/or the first arm member 42. The central post 38, first arm 42, second arm 82, first plate 74, and/or second plate 78 can be a metal material, composite material, wood, hard plastic, another material known in the art, or combinations thereof. The central post 38, first plate 74, second plate 78, first arm member 42, and second arm member 82 can be the same material or they can be different materials.

The central post 38 can have one or more fins 50 that extend from an outer surface of the central post 38 to an upper surface of the first plate 74. The fins 50 may extend outward proximate a perimeter of the first plate 74. The fins 50 can be any shape. In some embodiments, the fins 50 are triangular shaped when viewed from the front and are thin sheets of material when viewed from the side. In various embodiments, the fins 50 have a uniform thickness. In other embodiments, the fins 50 have a thickness that varies with height or length of the fin 50, for example, the fin 50 may get thicker toward the bottom of the fin 50. The fins 50 distribute the load on the central post 38 across the first plate 74. In some embodiments, the fins 50 can be a metal material, composite material, wood, hard plastic, any material known in the art, or combinations thereof.

The vehicle stabilizers 46 are interconnected to the ends 84 of the second arm 82. The hydraulic cylinders 86, 94 can increase and decrease (lengthen, expand, etc.) in length as the lift system 100 and conveyor system 2 move up and down from the road-travel position to the extended or deployed position and back to the road-travel position. In some embodiments, mechanisms other than hydraulic cylinders are used, for example, fixed arms or rods, telescoping arms or rods, etc. When the system 2 is in the road-travel position, the first hydraulic cylinder 86 is in a partially extended position and the second hydraulic cylinder 94 is in an extended position.

In the road-travel position, the first plate 74 is positioned on the truck bed and substantially parallel to the truck bed and the ground. The first arm 42 is substantially horizontal and substantially parallel to the first plate 74. The second plate 78 and vehicle stabilizers 46 are positioned substantially perpendicular to one another (approximately 90 degree angle) and are both positioned at an angle between 0 degrees and 90 degrees relative to a horizontal plane. However, the second plate 78 and vehicle stabilizers 46 are positioned at different or opposite angles relative to the horizontal plane since they are perpendicular, not parallel, to one another. The conveyor mount 34 is substantially horizontal and substantially parallel to the ground and the first plate 74. When the system 2 is in the road-travel position, the second plate 78 is at an angle between about 20 degrees and about 70 degrees relative to the mount 34.

Figure 5:
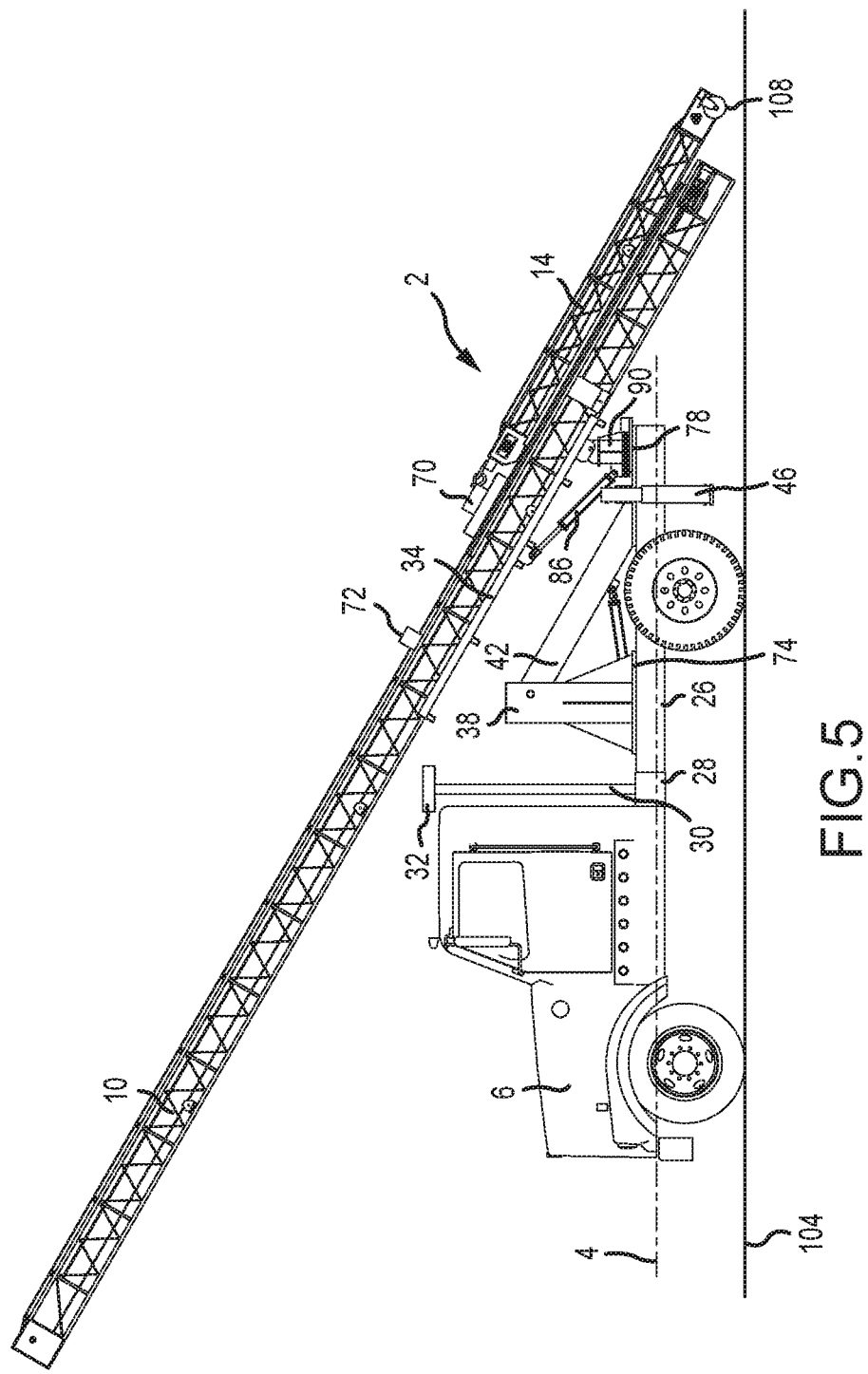
FIG. 5 is a side elevation view of an embodiment of the conveyor system interconnected to a vehicle and in the deployed position.

FIG. 5 is a side elevation view of an embodiment of the conveyor system 2 interconnected to a vehicle 6 and in the deployed position. Here the conveyors 10, 14 are deployed at an angle greater than 0 degrees relative to the ground 104 or a horizontal plane. In the position shown, the conveyors 10, 14 are stacked on top of one another and are at an angle of approximately 30 degrees to 45 degrees relative to the ground 104 or a horizontal plane. When in the deployed position, the first plate 74 and second plate 78 are positioned substantially flat on the bed or frame 26 of the vehicle 6. In some embodiments, the first plate 74 can be secured or fastened to (e.g., bolted down on) the truck bed 26 and remains in the same position on the truck bed 26 regardless of the deployed position of the conveyors 10, 14 (e.g., the angle of the conveyors 10, 14 relative to the ground 104, and the angle of the conveyors 10, 14 relative to a longitudinal axis 4 of the vehicle 6). The second plate 78 can be secured or fastened to the vehicle's frame rails 26, if the vehicle 6 has frame rails 26 in the appropriate location. The second plate 78 can be fastened or locked to the truck bed or frame 26 when the conveyors 10, 14 are in the deployed or extended position and when the conveyors 10, 14 are in the position of use.

In the deployed position, the vehicle stabilizers 46 are in a raised position and are not touching the ground 104. Thus, the system 2 is in the deployed position, but not the position of use. The vehicle stabilizers 46 should be lowered and engaging the ground 104 before the conveyor system 2 is used. One end of the feed conveyor 14 has wheels 108 to assist with moving the feed conveyor 14 around on the ground 104. Here, the feed conveyor 14 is still secured to the incline conveyor 10. Thus, the wheels 108 of the feed conveyor 14 are not yet touching the ground 104. If the system has more than two vehicle stabilizers 46, then all needed stabilizers 46 should be deployed and engage the ground 104.

FIGS. 6 and 7 show the conveyor system 2 without the conveyors and in the deployed position like FIG. 5. FIG. 6 is a top plan view and FIG. 7 is a side elevation view. When the system is in the deployed position, the first hydraulic cylinder 86 is in a partially extended position and the second hydraulic cylinder 94 is in a compressed position. The conveyor mount 34 is positioned at an angle relative to the ground and the first plate 74. The conveyor mount 34 is initially positioned substantially parallel to the first arm member 42. When the system 2 is in the deployed position, the second plate 78 is positioned substantially flat on the truck bed or frame and at an angle between about 20 degrees and about 70 degrees relative to the mount 34. The rotator gear 90 is rotatably interconnected to the conveyor mount 34, such that the rotator gear 90 can rotate relative to the conveyor mount 34 at the interconnection point.

The rotator gear 90 can be interconnected to the conveyor mount 34 via any known method. In some embodiments, the conveyor mount 34 has tabs or extensions 92 extending downward from the sides of the mount 34. The tabs or extensions 92 can have apertures for receiving a rod or bar 96 interconnected to the top of the rotator gear 90. The rod or bar 96 can be welded, screwed, or otherwise secured in any known manner to the tabs or extensions 92. As the rotator gear 90 rotates, the mount 34 rotates with the rotator gear 90 because the two are fixedly interconnected. In some embodiments, the rotator gear 90 is interconnected to the mount 34 in a different manner, for example a bar or rung of the mount 34 may be positioned through apertures in a top portion of the rotator gear 90.

In the deployed position, the vehicle stabilizers 46 are positioned substantially perpendicular to the ground, i.e., substantially vertical. In some embodiments, the vehicle stabilizers 46 can be fixedly interconnected to the second arm member 82 such that they do not rotate relative to the second arm member 82. In some embodiments, the vehicle stabilizers 46 can be rotatably interconnected to the second arm member 82 such that they can rotate relative to the second arm member 82. In some embodiments, the distal end 58 of the first arm member 42 is interconnected to a top surface of the second plate 78 and a bottom surface of the rotator gear 90 is interconnected to and positioned adjacent to the top surface of the second plate 78.

FIG. 8 is a rear elevation view of the conveyor system 2 without the conveyors and in the position of use; thus, the stabilizers 46 have been lowered and are resting on the ground. In some embodiments, the stabilizers 46 can be hydraulic-powered stabilizers that are controlled remotely or the stabilizers 46 can have controls on the stabilizers 46. In some embodiments, the stabilizers 46 raise and lower at the same rate and via one control. In other embodiments, the stabilizers 46 are separately controlled such that one can raise or lower and the other can remain stationary. This type of control may be preferred if the ground below the system is uneven and one stabilizer 46 needs to be extended more than the other stabilizer 46. The stabilizers 46 can have two or more telescoping portions such that one portion slides into and out of the other portion(s). The stabilizers 46 can have feet 112 on the distal ends of the stabilizers 46. The feet 112 can be solid pieces of material and the bottom surfaces of the feet 112 can be substantially flat. The feet 112 may be sized such that their outer perimeter is larger than the outer perimeter of the vehicle stabilizers 46. Thus, the feet 112 can have a larger footprint than the vehicle stabilizers 46. The feet 112 can have a square shape, round shape, oval shape, or any other shape desired. Additionally, the size (thickness and diameter or length/width) of the feet 112 can vary depending on the desired application and embodiment. For example, the feet 112 can be larger than shown in the figures. The feet 112 help distribute the load of the system on the ground. The feet 112 can be any known material in the art, including metal, hard plastic, rubber, wood, composite material, and combinations thereof. The feet 112 can be one material (e.g., metal) and have a coating or layer of another material (e.g., rubber) on the bottom surfaces that contact the ground.

Figure 9:
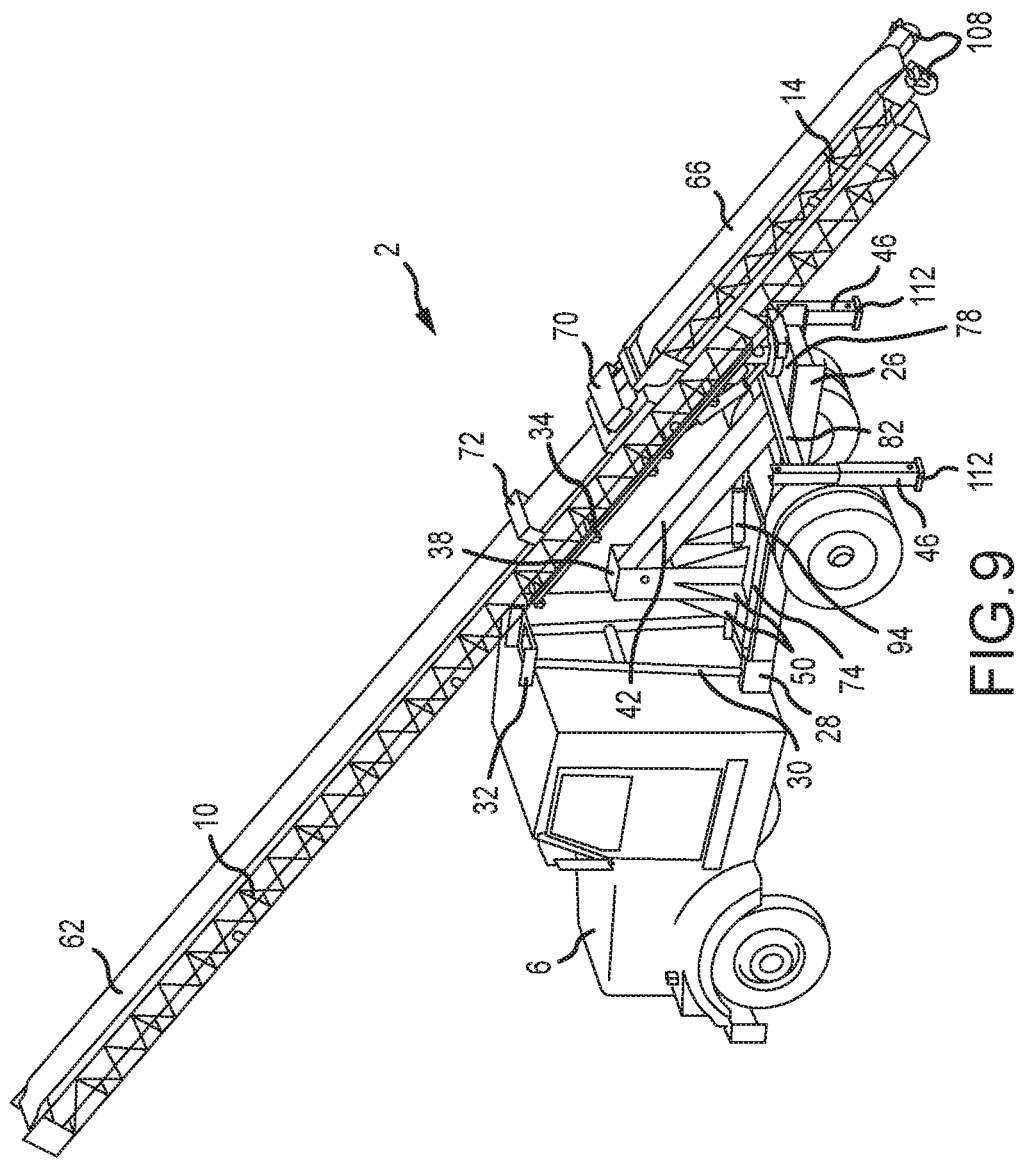
FIG. 9 is a rear perspective view of an embodiment of the conveyor system showing the incline conveyor deployed and locked to the vehicle.

FIG. 9 is a rear perspective view and shows the incline conveyor 10 deployed and locked to the vehicle 6 and/or vehicle frame 26. Additionally, the vehicle stabilizers 46 are deployed such that the feet 112 of the vehicle stabilizers 46 are positioned on the ground. FIG. 9 is similar to FIG. 5, except that the vehicle stabilizers 46 are deployed and touching and/or engaging the ground. In this view, the feed conveyor 14 is locked to the incline conveyor 10. Before use, the feed conveyor 14 would need to be released and slid down the incline conveyor 10 using the trolley rail system 70. Also in this view, the positioning and locations of the fins 50 and second hydraulic cylinder 94 can be seen, according to some embodiments. In this position, the incline conveyor 10 is no longer touching or resting on the holder 32.

FIGS. 10 and 11 are rear elevation views of the conveyor system 2 interconnected to a vehicle 6, with the conveyors 10, 14 rotated approximately 90 degrees to the left as compared to FIGS. 5 and 9. Although the conveyors 10, 14 are shown rotated about 90 degrees to the left, they can be rotated to right between 0 degrees and 180 degrees relative to the vehicle's longitudinal axis and rotated to the left between 0 degrees and 180 degrees relative to the vehicle's longitudinal axis. Before the conveyors 10, 14 can be rotated to the left or right relative to the longitudinal axis of the vehicle 6, the incline conveyor 10 must be released or unlocked from the truck bed or frame 26. The rotator gear 90 is used to rotate the conveyors 10, 14 to the left or right, such that they are in the desired position for use. In FIG. 10, the incline conveyor 10 is cut off (not fully shown) and both conveyors 10, 14 are stacked on top of one another. Thus, the feed conveyor 14 is locked in position on top of the incline conveyor 10.

The incline conveyor 10 has a top (discharge) end 116 and a bottom (infeed) end 120. The feed conveyor 14 is positioned proximate the bottom end 120 of the incline conveyor 10. Prior to use, the feed conveyor 14 can be released or unlocked and permitted to slide down the incline conveyor 10 via the trolley rail system 70. Thus, the trolley rail system 70 slides down toward the bottom end 120 of the incline conveyor 10. The trolley rail system 70 is described in more detail with FIG. 17. FIG. 11 is a rear view and also shows the conveyor system 2 interconnected to a vehicle 6 with the incline conveyor 10 in the same position as FIG. 10, but the feed conveyor 14 is also extended and has slid down the incline conveyor 10. FIG. 11 is a material loading position. The end of the feed conveyor 14 has wheels 108 to assist in sliding the feed conveyor 14 down the incline conveyor 10 and positioning the feed conveyor 14 in the desired position. This end of the feed conveyor 14 may also have handles to assist in positioning the feed conveyor 14 in the desired location. In some embodiments, the feed conveyor 14 is positioned at a smaller angle relative to the ground 104 than the incline conveyor 10. The feed conveyor 14 may be positioned in line with the incline conveyor 10 (as shown in FIGS. 11-13) or can be rotated in some embodiments such that the two conveyors 10, 14 are not aligned.

In FIGS. 10 and 11, the first hydraulic cylinder 86 is extended a predetermined amount to position the incline conveyor 10 at the desired angle relative to the ground 104 and, thus, the desired height of the top end 116 of the incline conveyor 10. Additionally, the conveyor 10 is no longer interconnected to or positioned on the stand 30. The vehicle stabilizers 46 are deployed and resting on the ground 104. The vehicle stabilizers 46 transfer the load from the conveyors 10, 14 to the ground 104 and prevent the vehicle from rolling while the conveyors 10, 14 are in use.

Figure 12:
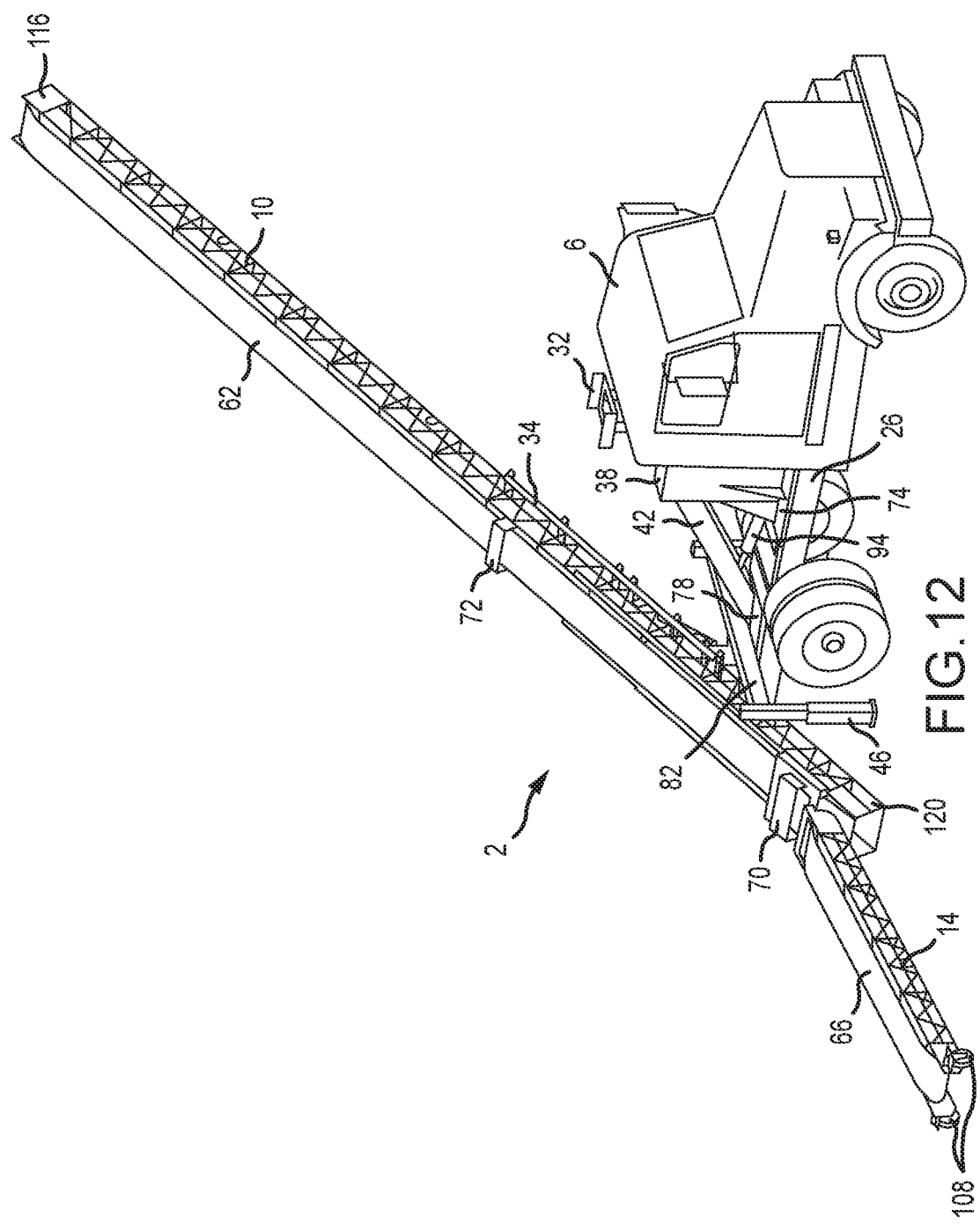
FIG. 12 is a side perspective view of an embodiment of the conveyor system in the material loading position.

FIG. 12 shows the conveyor system 2 in a material loading position, like FIG. 11. Here, the incline conveyor 10 is rotated to the left approximately 90 degrees and the feed conveyor 14 is no longer piggy backed on the incline conveyor 10. The feed conveyor 14 extends from the bottom end 120 of the incline conveyor 10. The incline conveyor 10 can be rotated less than 90 degrees to the left, more than 90 degrees to the left, or be rotated up to 180 degrees to the right depending on the location of the final destination of the material. Before the incline conveyor 10 is rotated to the right or left relative to the longitudinal axis of the vehicle 6, the stabilizers 46 should be deployed and should engage the ground. Additionally, the feed conveyor 14 can be rotated relative to the incline conveyor 10. In one embodiment, the incline conveyor 10 is about 40 feet long and can be positioned at a 30-degree angle relative to the ground or a horizontal plane. Accordingly, the incline conveyor 10 has a discharge height (height above the ground) of about 20 feet.

Figure 13:
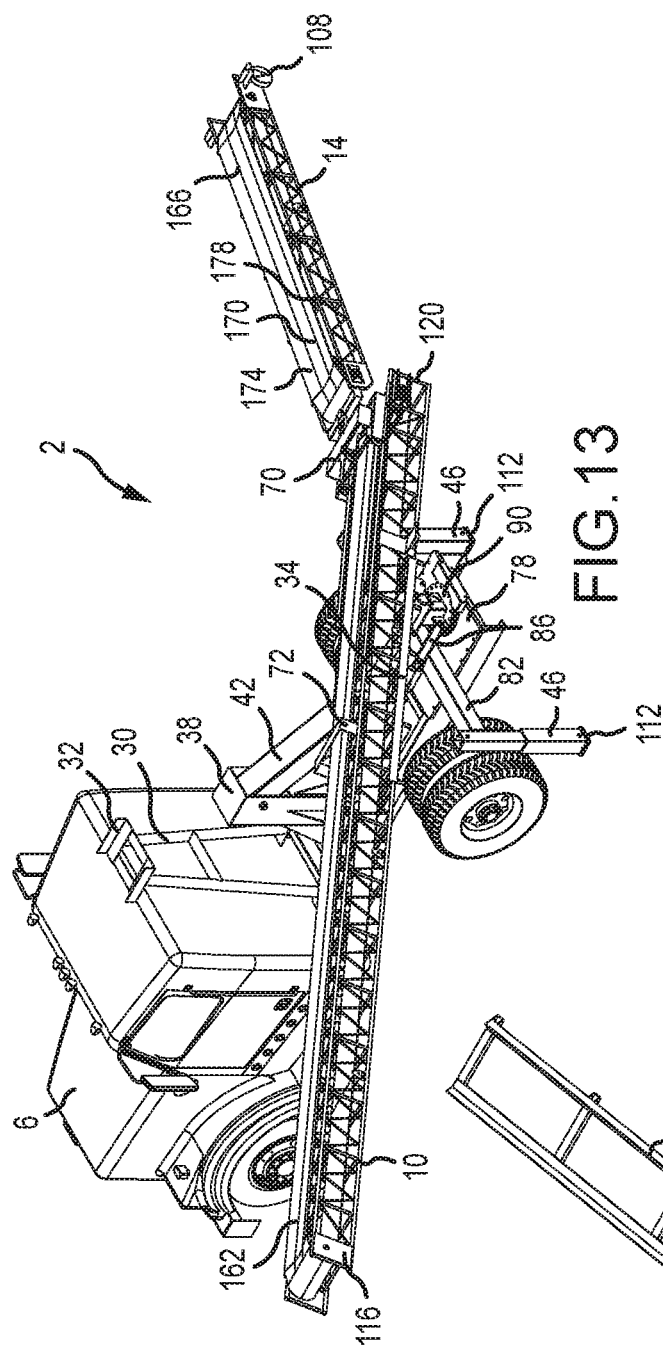
FIG. 13 is a rear perspective view of an embodiment of the conveyor system in a material loading position.

FIGS. 12 and 13 show the second arm member 82 positioned substantially flat on or adjacent to the second plate 78. In some embodiments, the second arm member 82 is interconnected to the second plate 78. For example, the bottom surface of the second arm member 82 can be substantially flat and touching a substantially flat upper surface of the second plate 78. The first arm member 42 may touch or be interconnected to the second arm member 82 in some embodiments. In other embodiments, the first arm member 42 does not touch and is not interconnected to the second arm member 82; rather, the first arm member 42 is only interconnected to an upper surface of the second plate 78.

FIGS. 13-16 show the conveyor system 2 in a material loading position or an operating position. FIG. 13 is a rear perspective view of one embodiment of the conveyor system 2. The rotator gear 90 has rotated the conveyor approximate 90 degrees to the left relative to the longitudinal axis of the vehicle 6. In FIG. 13 the incline conveyor 10 is extended at an angle of approximately 30 degrees to 45 degrees relative to the ground or a horizontal plane and the feed conveyor 14 extends from the lower end 120 of the incline conveyor 10. The first hydraulic cylinder 86 holds the mount 34, and thus the conveyor 10, at the desired angle and discharge height. The feed conveyor 14 is at a smaller angle relative to the ground than the incline conveyor 10. The vehicle stabilizers 46 are extended and the feet 112 of the stabilizers rest on the ground. Both the first and second plates 78 are positioned flat on the truck bed or frame. The belts 162, 166 on the conveyors 10, 14 are different than shown in other figures. Either conveyor belt can be used in any embodiment described herein. The conveyor belt 162 on the incline conveyor 10 and the conveyor belt 166 on the feed conveyor 14 both have a curved or angled shape comprised of three sections: a substantially flat center portion 170, an angled first side portion 174, and an angled second side portion 178. This type of conveyor belt 162, 166 is typically used with loose gravel, concrete, or other loose material. The angled sides 174, 178 prevent (or at least lessen the amount of) the material from falling off of the belt 162, 166. Other conveyor belts, or conveyors without belts, can be used with this embodiment or any embodiment shown or described herein.

Figure 14:
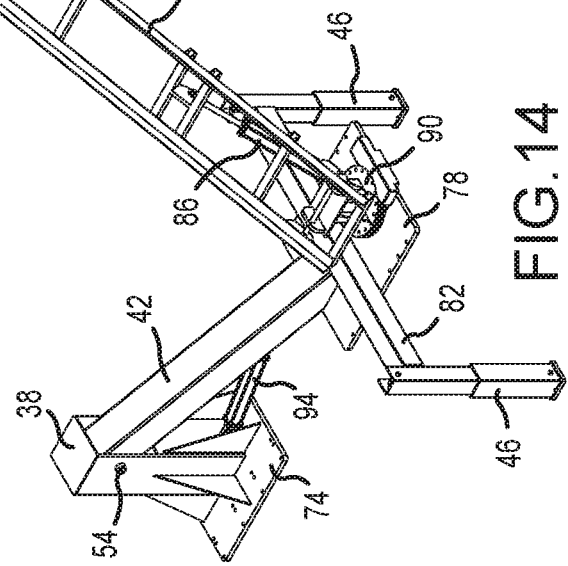
FIG. 14 is a rear perspective view of the system in the material loading position without the conveyors and the mount is rotated to the right about 90 degrees.

FIG. 14 is a rear perspective view and shows an embodiment of the system 2 without the conveyors. The system 2 is in a similar position as FIG. 13, except that here the rotator gear 90 has rotated the mount 34 to the right about 90 degrees relative to the longitudinal axis of the vehicle. The first 74 and second 78 plates are positioned substantially flat on the truck bed and can be locked or fastened to the truck bed or frame. The first hydraulic cylinder 86 holds the mount 34, and thus the conveyor 10, at the desired angle relative to the ground or a horizontal plane.

Figure 15:
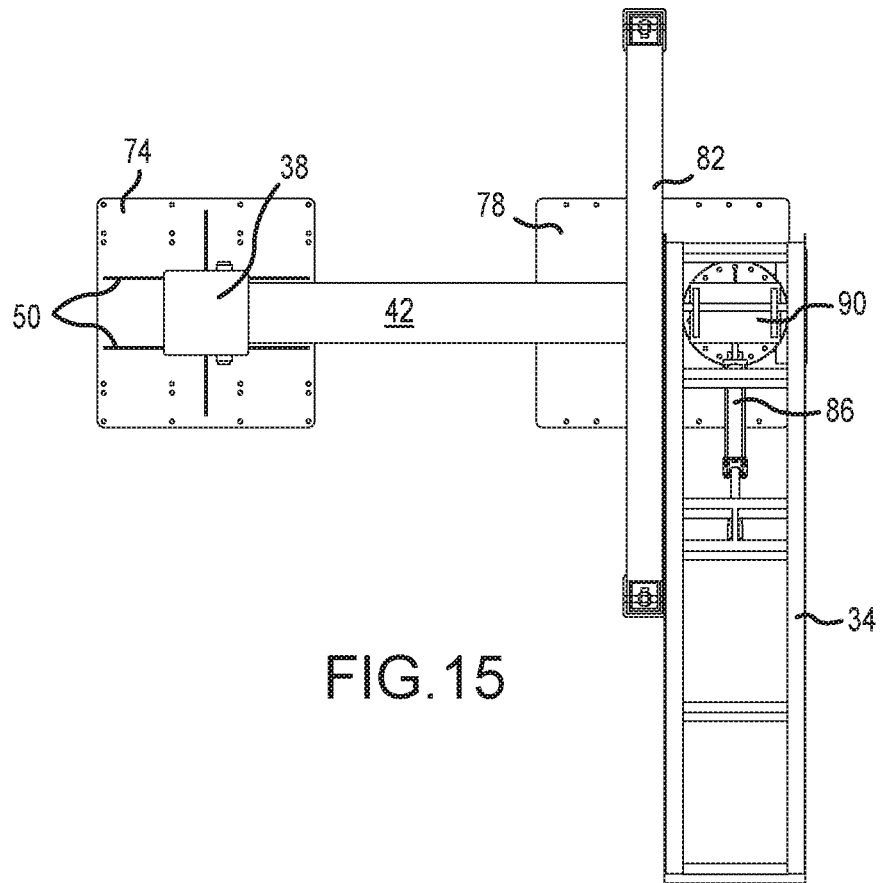
FIG. 15 is a top plan view of the system in the material loading position without the conveyors and the mount is rotated to the left about 90 degrees.
Figure 16:
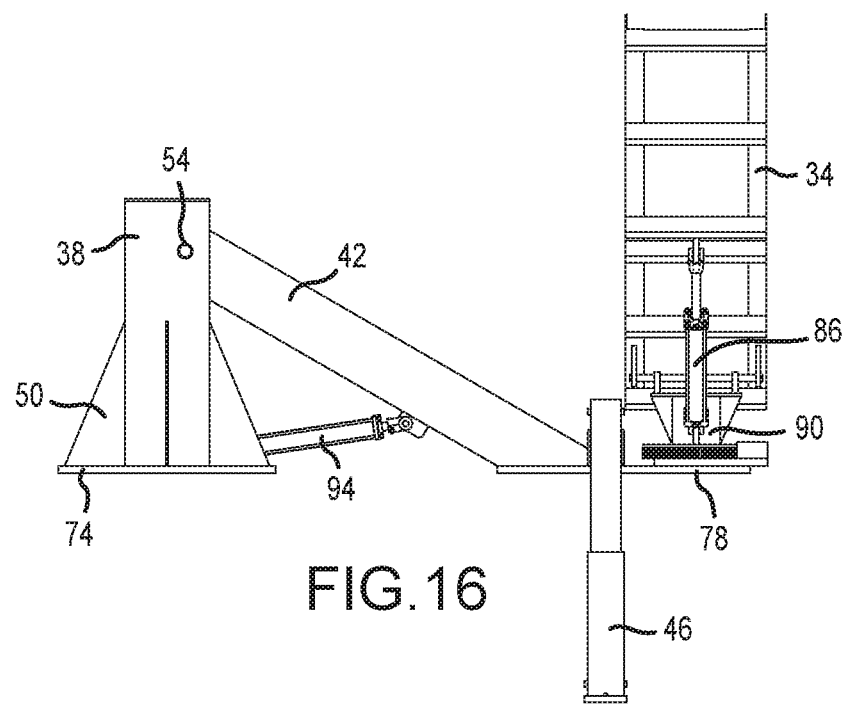
FIG. 16 is a side elevation view of the system of FIG. 15.

FIG. 15 is a top plan view and FIG. 16 is a side elevation view of an embodiment of the system without the conveyors. The system is in a similar position as FIG. 14, except that here the rotator gear 90 has rotated the mount 34 approximately 90 degrees to the right relative to the longitudinal axis of the vehicle. The rotator gear 90 is interconnected to the mount 34 and rotates the mount to the desired position.

Figure 17:
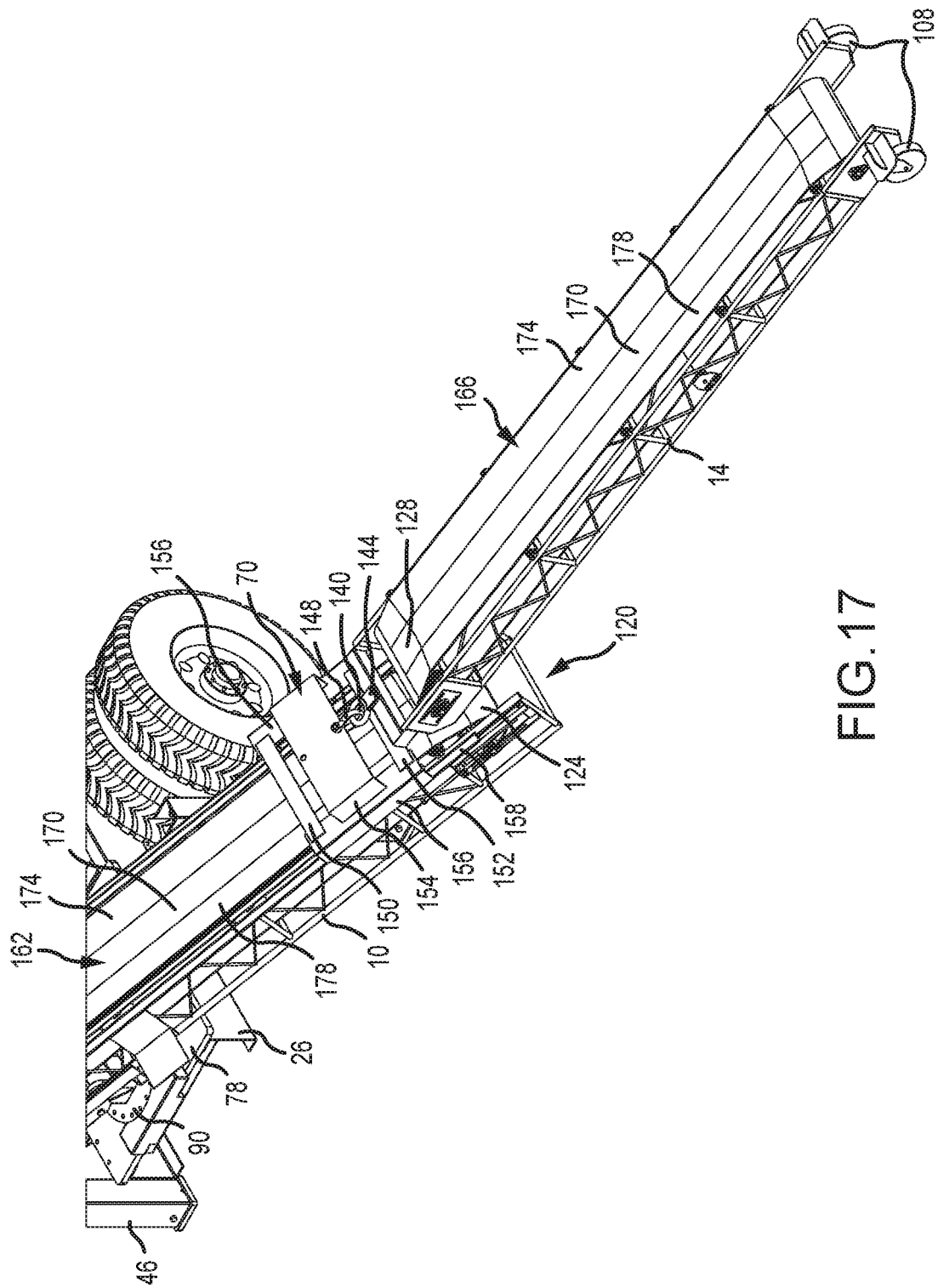
FIG. 17 is an enlarged view of the feed conveyor and trolley rail system.

FIG. 17 is an enlarged view of the bottom end 120 of the incline conveyor 10, the feed conveyor 14, and the trolley rail system 70 of a vehicle-mounted conveyor system. The feed conveyor 14 can rotate around a pivot point 140 such that it rotates relative to the incline conveyor 10. The conveyor belt 162 on the incline conveyor 10 and the conveyor belt 166 on the feed conveyor 14 both have a curved or angled shape comprised of three sections: a substantially flat center portion 170, an angled first side portion 174, and an angled second side portion 178. The bottom end 120 of the incline conveyor belt 162 has a downward angled portion 124 positioned under the feed conveyor 14 in this view. The top end of the feed conveyor belt 166 has a downward angled portion 128, which drops the conveyed articles onto the incline conveyor belt 162.

The trolley rail system 70 comprises slides 156 (one on each side of the conveyor 10) that slide along rails 158 (one on each side of the conveyor 10) interconnected to the conveyor frame. The slides 156 can include wheels (not visible in this view) that roll or slide along the rails 158. The trolley also includes a raised center bar 154, an upper bar 150, and a lower bar 152 extending from one slide 156 to the other slide 156. The upper 150 and lower 152 bars support the trolley rail system 70, and the raised center bar 154 provides a location for the feed conveyor 14 to interconnect to the trolley rail system 70. The raised center bar 154 has an interconnection ring 148. The feed conveyor 14 has an interconnection mechanism 144 that includes a horizontal bar and a ring interconnected to the trolley's interconnection ring 148. The pivot point 140 of the feed conveyor 14 is where the two rings interconnect.

As the conveyed material or articles travel up the feed conveyor belt 166, they slide down the angled portion 128 and under the interconnection mechanism 144 and onto the incline conveyor belt 162. The conveyed material or articles is conveyed up the incline conveyor belt 162 and under the trolley rail system 70. If the articles are wider than the conveyor belts 162, 166 or taller than the upper 150 and lower 152 bars of the trolley, then the trolley (i.e., component numbers 150, 152, 154, and 156) can be removed or detached from the incline conveyor 10 and the feed conveyor 14 can lock onto the frame of the incline conveyor 10. In some embodiments, an additional piece can be used to interconnect the feed conveyor 14 to the incline conveyor 10. For example, the top end of the feed conveyor 14 can rest or be positioned on a metal piece positioned proximate the bottom end 120 of the incline conveyor 10, where the metal piece spans from one side of the incline conveyor 10 to the other side and is positioned slightly above the incline conveyor belt 162 as to not interfere with the incline conveyor belt 162. The metal piece may be angled and/or may interconnect to the frame of the incline conveyor 10. One example of such a metal piece is shown here: https://www.ezliftconveyors.com/wp-content/uploads/E-Z-T050-brochure.pdf, which is incorporated by reference in its entirety. Additionally, the interconnection mechanism 144 may need to be removed or detached for the larger material or articles to be conveyed. The wheels 108 of the feed conveyor 14 can lock to prevent the feed conveyor 14 from moving.

A hopper can be added to the bottom end of the feed conveyor to assist in directing the material to be conveyed onto the feed conveyor 14. An example of such a hopper is shown here: https://www.ezliftconveyors.com/wp-content/uploads/E-Z-T050-brochure.pdf, which is incorporated by reference in its entirety.

The conveyor belt of various embodiments can be any conveyor belt known or used in the art. The conveyor belt can have a rough upper/outer surface or a smooth upper/outer surface. The conveyor belt can be flat, curved, or angled.

Any combination of any components shown or described herein can be used in various embodiments. Thus, parts from one figure or description can be used with parts from another figure or description without departing from the invention.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

What is claimed is:

1. A conveyor system capable of being interconnected to a motor vehicle, comprising:
    a first conveyor;
    a second conveyor interconnected to the first conveyor;
    a conveyor mount, wherein the first conveyor is interconnected to the conveyor mount;
    a first plate interconnected to a first flat portion of the motor vehicle;
    a post interconnected to the first plate and extending upwardly from the first plate;
    a first arm member interconnected on a first end to the post;
    a second plate interconnected to a second end of the first arm member;
    a second arm member interconnected to an upper surface of the second plate;
    a first vehicle stabilizer extending downward from a first end of the second arm member;
    a second vehicle stabilizer extending downward from a second end of the second arm member;
    a rotator gear interconnected to the upper surface of the second plate and the conveyor mount;
    a first hydraulic cylinder interconnected to the post and the first arm member; and
    a second hydraulic cylinder interconnected to the conveyor mount and the rotator gear,
    wherein the conveyor system has a first travel position and a second deployed position.

2. The conveyor system of claim 1, wherein the first plate and the second plate have substantially flat upper surfaces and substantially flat lower surfaces.

3. The conveyor system of claim 1, wherein when the conveyor system is in the second deployed position the second plate is positioned on a second flat portion of the motor vehicle.

4. The conveyor system of claim 1, wherein the second conveyor is interconnected to the first conveyor via a trolley rail system, wherein the trolley rail system raises and lowers the second conveyor along the first conveyor.

5. The conveyor system of claim 4, wherein the trolley rail system comprises a trolley and one or more rails, and wherein a top end of the second conveyor is interconnected to the trolley.

6. The conveyor system of claim 1, wherein the second conveyor can rotate 180 degrees relative to the first conveyor.

7. The conveyor system of claim 1, wherein the first conveyor is positioned at an angle between about 30 degrees and about 60 degrees relative to a horizontal plane when the conveyor system is in the second deployed position.

8. The conveyor system of claim 1, wherein the first arm member is rotatably interconnected to an upper portion of the post.

9. The conveyor system of claim 1, wherein when the conveyor system is in the first travel position the first hydraulic cylinder is extended and pushing upward on the first arm member, and wherein when the conveyor system is in the second deployed position the first hydraulic cylinder is in a compressed position and is pulling downward on the first arm member.

10. A conveyor system capable of being interconnected to a motor vehicle, comprising:
    an incline conveyor;
    a feed conveyor interconnected to the incline conveyor, wherein the feed conveyor is shorter than the incline conveyor;
    a conveyor mount, wherein the incline conveyor is interconnected to the conveyor mount;
    a first plate interconnected to a first flat portion of the motor vehicle;
    a post interconnected to the first plate and extending upwardly from the first plate;
    a first arm member interconnected on a first end to the post;
    a second plate interconnected to a second end of the first arm member;
    a plurality of fins extending outward from the post and interconnected to an upper surface of the second plate;
    a second arm member interconnected to an upper surface of the second plate;
    a first vehicle stabilizer extending downward from a first end of the second arm member;
    a second vehicle stabilizer extending downward from a second end of the second arm member;
    a rotator gear interconnected to the upper surface of the second plate and the conveyor mount;
    a first hydraulic cylinder interconnected to the post and the first arm member; and
    a second hydraulic cylinder interconnected to the conveyor mount and the rotator gear, wherein the second hydraulic cylinder moves the conveyor mount and the incline conveyor into a desired angle relative to a ground surface,
    wherein the conveyor system has a first travel position and a second deployed position, and
    wherein when the conveyor system is in the first travel position, the first hydraulic cylinder is extended and pushing upward on the first arm member, and wherein when the conveyor system is in the second deployed position, the first hydraulic cylinder is in a compressed position and is pulling downward on the first arm member.

11. The conveyor system of claim 10, wherein the first plate and the second plate have substantially flat upper surfaces and substantially flat lower surfaces, and wherein when the conveyor system is in the second deployed position the second plate is positioned on a second flat portion of the motor vehicle.

12. The conveyor system of claim 10, wherein the feed conveyor is interconnected to the incline conveyor via a trolley rail system, wherein the trolley rail system raises and lowers the feed conveyor along the incline conveyor.

13. The conveyor system of claim 12, wherein the trolley rail system comprises two rails and a trolley having two slides that slide along the two rails, a center bar interconnecting the two slides, and a first ring interconnected to the center bar, and wherein a top end of the feed conveyor is interconnected to the trolley via an interconnection mechanism having a second ring interconnected to the first ring of the trolley.

14. The conveyor system of claim 10, wherein the feed conveyor can rotate 180 degrees relative to the incline conveyor.

15. The conveyor system of claim 10, wherein the incline conveyor is positioned at an angle between about 30 degrees and about 60 degrees relative to the horizontal plane when the conveyor system is in the second deployed position.

16. The conveyor system of claim 10, wherein the first arm member is rotatably interconnected to an upper portion of the post.

17. A method for deploying a vehicle-mounted conveyor system, comprising:
   providing a first conveyor and a second conveyor interconnected to the first conveyor;
   providing a conveyor mount and interconnecting the first conveyor to the conveyor mount;
   interconnecting a first plate to a first flat portion of a motor vehicle;
   providing a post interconnected to the first plate, wherein the post extends upwardly from the first plate;
   providing a first arm member interconnected on a first end to the post at an interconnection point, a second plate interconnected to a second end of the first arm member, a second arm member interconnected to an upper surface of the second plate, a first vehicle stabilizer extending downward from a first end of the second arm member, a second vehicle stabilizer extending downward from a second end of the second arm member, a rotator gear interconnected to the upper surface of the second plate and the conveyor mount, a first hydraulic cylinder interconnected to the post and the first arm member, and a second hydraulic cylinder interconnected to the conveyor mount and the rotator gear;
   positioning the conveyor system in a first travel position;
   contracting the first hydraulic cylinder and pulling downward on the first arm member;
   rotating the first arm member around the interconnection point until the second plate is positioned on a second flat surface of the motor vehicle, wherein the second hydraulic cylinder and the rotator gear pull downward on the conveyor mount;
   extending the first and second vehicle stabilizers to a ground surface;
   extending the second hydraulic cylinder to position the conveyor mount and the first conveyor at a desired angle relative to the ground surface;
   rotating the rotator gear to rotate the conveyor mount and the first conveyor at a desired position; and
   sliding the second conveyor down the first conveyor and into a desired feed position.

18. The method for deploying the vehicle-mounted conveyor system of claim 17, further comprising providing a trolley rail system for raising and lowering the second conveyor along the first conveyor.

19. The method for deploying the vehicle-mounted conveyor system of claim 18, wherein the trolley rail system comprises a trolley and one or more rails, and wherein a top end of the second conveyor is interconnected to the trolley.

* * * * *